(12) United States Patent
Hung

(10) Patent No.: US 11,712,325 B2
(45) Date of Patent: Aug. 1, 2023

(54) VIBRATION DEVICE FOR DENTAL USE AND ORTHODONTIC CORRECTION METHOD

(71) Applicant: Cheng-Hsiang Hung, New Taipei (TW)

(72) Inventor: Cheng-Hsiang Hung, New Taipei (TW)

( * ) Notice: Subject to any disclaimer, the term of this patent is extended or adjusted under 35 U.S.C. 154(b) by 384 days.

(21) Appl. No.: 16/885,068

(22) Filed: May 27, 2020

(65) Prior Publication Data

US 2020/0375697 A1 Dec. 3, 2020

Related U.S. Application Data

(60) Provisional application No. 62/853,307, filed on May 28, 2019.

(51) Int. Cl.
*A61C 7/00* (2006.01)

(52) U.S. Cl.
CPC .................................... *A61C 7/008* (2013.01)

(58) Field of Classification Search
CPC ............... A61C 7/36; A61C 7/008; A61C 5/90
USPC .......................................................... 433/18
See application file for complete search history.

(56) References Cited

U.S. PATENT DOCUMENTS

| | | | | |
|---|---|---|---|---|
| 4,123,844 A * | 11/1978 | Kurz | ...................... | A61C 7/008 433/5 |
| 4,348,178 A * | 9/1982 | Kurz | ...................... | A61C 7/008 433/5 |
| 5,030,098 A * | 7/1991 | Branford | ................. | A61H 23/00 433/229 |
| 5,967,784 A * | 10/1999 | Powers | ..................... | A61C 7/00 601/72 |
| 6,648,639 B2 | 11/2003 | Mao | | |
| 8,500,446 B2 * | 8/2013 | Lowe | ....................... | A61C 7/00 433/18 |
| 9,028,250 B2 * | 5/2015 | Spaulding | ................ | A61C 7/08 433/18 |
| 9,662,183 B2 * | 5/2017 | Lowe | ...................... | A61C 7/006 |
| 2013/0252193 A1 * | 9/2013 | Bowman | ................... | A61C 7/08 433/24 |

(Continued)

FOREIGN PATENT DOCUMENTS

| | | |
|---|---|---|
| CA | 3005099 | 5/2017 |
| CN | 105534614 A | 5/2016 |

(Continued)

*Primary Examiner* — Matthew M Nelson

(57) ABSTRACT

A vibration device for dental use is provided, including a support member and a vibration transmission member. The support member is adapted to fit in the space between the upper and lower teeth on one side of the mouth, and includes a frame and an elastic layer. The frame is configured to maintain a shape defining an inner cavity having a first opening formed on the first side of the support member and a second opening formed on the second side of the support member. The elastic layer covers the surfaces of the frame. The vibration transmission member has a connector end for coupling to a vibration source and an insertion end configured to be inserted into the inner cavity of the support member so as to transmit the vibration energy generated by the vibration source to the upper and lower teeth of the patient.

16 Claims, 6 Drawing Sheets

(56) References Cited

U.S. PATENT DOCUMENTS

| | | | |
|---|---|---|---|
| 2013/0273490 A1* | 10/2013 | Way | A61C 7/008 433/24 |
| 2015/0125801 A1* | 5/2015 | Bowman | A61C 7/008 433/2 |
| 2015/0173857 A1* | 6/2015 | Lowe | A61C 7/08 433/24 |
| 2015/0182305 A1* | 7/2015 | Lowe | A61C 7/008 433/2 |
| 2017/0224443 A1* | 8/2017 | Florman | A61C 7/14 |
| 2020/0093574 A1* | 3/2020 | Way | A61C 7/08 |
| 2020/0093575 A1* | 3/2020 | Way | A61C 7/008 |

FOREIGN PATENT DOCUMENTS

| | | | |
|---|---|---|---|
| CN | 105748164 A | | 7/2016 |
| CN | 109152621 A | | 1/2019 |
| CN | 208511214 U | | 2/2019 |
| CN | 109481044 A | * | 3/2019 |
| JP | 2016-171960 A | | 9/2016 |
| WO | WO 2007/116656 A1 | | 10/2007 |

* cited by examiner

VIBRATION DEVICE FOR DENTAL USE AND ORTHODONTIC CORRECTION METHOD

CROSS REFERENCE TO RELATED APPLICATIONS

This application claims the benefit of U.S. Provisional Application No. 62/853,307, filed on May 28, 2019, the entirety of which is incorporated by reference herein.

BACKGROUND OF THE INVENTION

Field of the Invention

The application relates in general to a vibration device for dental use, and in particular to a vibration device that includes a support member and a vibration transmission member.

Description of the Related Art

Devices used in the prior art transfer vibration energy from an extraoral source to the teeth in the patient's mouth. For instance, a U-shaped bite plate with a vibration source can be placed in the patient's mouth, and the patient bites down on the bite plate and holds the device hands-free for twenty minutes each day.

Such prior-art vibration devices operate at frequency and amplitude ranges that may vary, claiming to enhance orthodontic tooth movement, to increase aligner fit, and to enhance bone remodeling around teeth. The idea is that dynamic loading or cyclic forces lead to greater bone remodeling than a static force, and tooth movement is accomplished by remodeling the surrounding alveolar bone. The step of bone formation in bone remodeling is the limiting factor in bone remodeling, and cyclic force can speed up bone formation.

In another example, a vibration device in the form of a stick can be held in place by being sandwiched between the upper and lower teeth. The vibrating stick can be moved to different locations to contact desired teeth. The device can be programmed to instruct the user to move the vibrating stick to specific teeth to deliver focused energy to those teeth.

The problem with bite plates requiring patients to bite down is that the force of the bite is not stable and can lead to muscle fatigue. Vibrating stick claims to use only gravity to affix the device. The forces being delivered to both jaws can be adjusted by changing the position of the stick and the position of tooth contact. The actual forces delivered also depend on how hard the patient is clenching on the stick. It is an important issue to provide a better vibration device for dental use.

BRIEF SUMMARY OF INVENTION

To address the deficiencies of conventional products, an embodiment of the invention provides a vibration device for dental use, including a support member and a vibration transmission member. The support member is adapted to fit in the space between the upper and lower teeth on one side of the mouth, including a frame and an elastic layer. The frame is configured to maintain a shape that defines an inner cavity, wherein the inner cavity has a first opening formed on the first side of the support member and a second opening formed on the second side of the support member opposite the first side. The first opening is larger than the second opening. The elastic layer covers the surfaces of the frame. The vibration transmission member is configured to connect to the vibration source and has a connector end for coupling to the vibration source and an insertion end configured to be inserted into the inner cavity of the support member so as to transmit the vibration energy generated by the vibration source to the upper and lower teeth of the patient.

In some embodiments, the inner cavity is trapezoidal in shape.

In some embodiments, the insertion end of the vibration transmission member is designed in a shape that matches the shape of the inner cavity.

In some embodiments, the insertion end has protrusions configured to fit the depressions formed in the support member so that the vibration transmission member can be retained in the support member.

In some embodiments, the connector end has a hole for connecting a vibrator of the vibration source.

In some embodiments, the frame of the support member comprises metal material.

In some embodiments, the elastic layer of the support member comprises a silicone material.

In some embodiments, the support member further comprises a hinge mechanism configured to allow the support member to switch between an open state and a closed state.

In some embodiments, when the vibration transmission member is inserted into the inner cavity of the support member and the support member is switched from the open state to the closed state, the vibration transmission member is engaged with the support member In some embodiments, the insertion end has at least one protruding contact formed thereon configured to contact at least one recess exposed on the inner cavity of the support member.

In some embodiments, the insertion end further has a plurality of protruding contacts disposed on both upper and lower surfaces of the insertion end. The support member further has a plurality of recesses formed on both the upper part and the lower part of the support member, and the recesses are exposed on the inner cavity of the support member, wherein each protruding contact corresponds to each recess and is received therein.

An embodiment of the invention provides an orthodontic correction method, including mounting a pair of vibration devices between the upper and lower teeth on the two sides of the mouth; and activating the vibration source for each side of the mouth in turn with a rest period therebetween.

In some embodiments, each vibration device is mounted between the upper and lower first molars and the second premolars on one side of the mouth.

In some embodiments, the connector end of the vibration transmission member for each of the vibration devices extends to the outside of the mouth to connect with the respective vibration source.

Another embodiment of the invention provides a vibration device for dental use, comprising: a support member and a vibration transmission member. The support member is adapted to fit in a space between upper and lower teeth on one side of the mouth, including: a mesial end, a distal end, a top surface configured to contact the upper teeth, and a bottom surface configured to contact the bottom teeth, with the top and bottom surfaces set at an angle such that a vertical distance between the top surface and the bottom surface gradually decreases from the mesial to the distal end of the support member. The vibration transmission member having an extraoral end and an intraoral end, configured to connect to a vibration source at the extraoral end and to the support member at the intraoral end so as to transmit a vibration energy generated by the vibration source to the support member and the upper and lower teeth of the patient in contact with the support member.

In some embodiments, the intraoral end has a trapezoidal shape which matches the support member.

In some embodiments, the support member and the vibration transmission member are integrally formed.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the vibration devices and correction methods are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
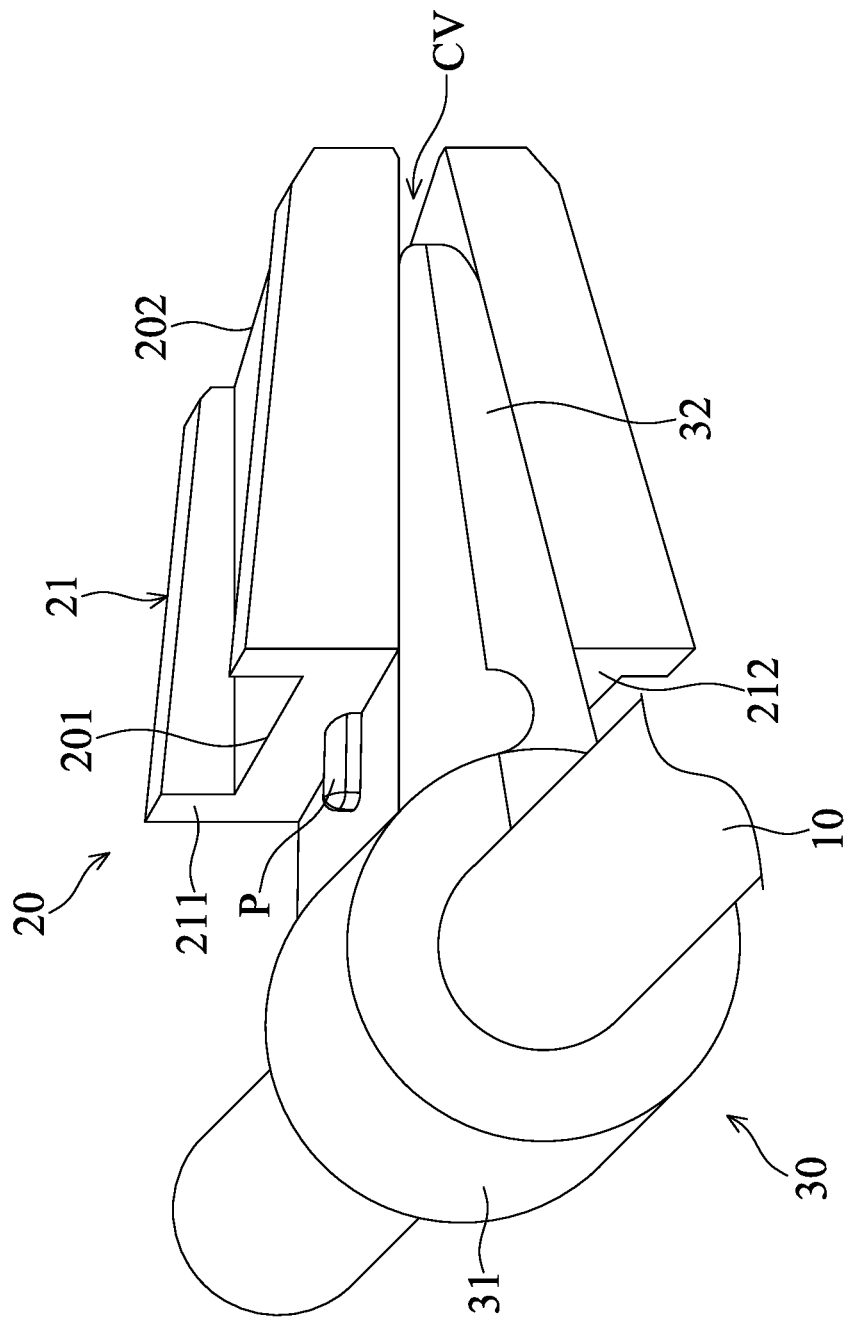
FIG. 1 is a schematic diagram of the vibration device for dental use according to an embodiment of the present invention.

Referring to FIG. 1, which is a schematic view showing the vibration device 100 for dental use. The vibration device 100 can be mounted, for example, between the upper and lower teeth on the two sides of the mouth of a patient. Vibration energy to the teeth and the alveolar bone can be provided from the vibration device 100 and configured to simulate those vibration effects generated during mastication following a regular masticatory pattern, and the patient can hold the vibration device 100 in place without any biting down action. The structure of the vibration device 100 will be explained in detail below.

Figure 2:
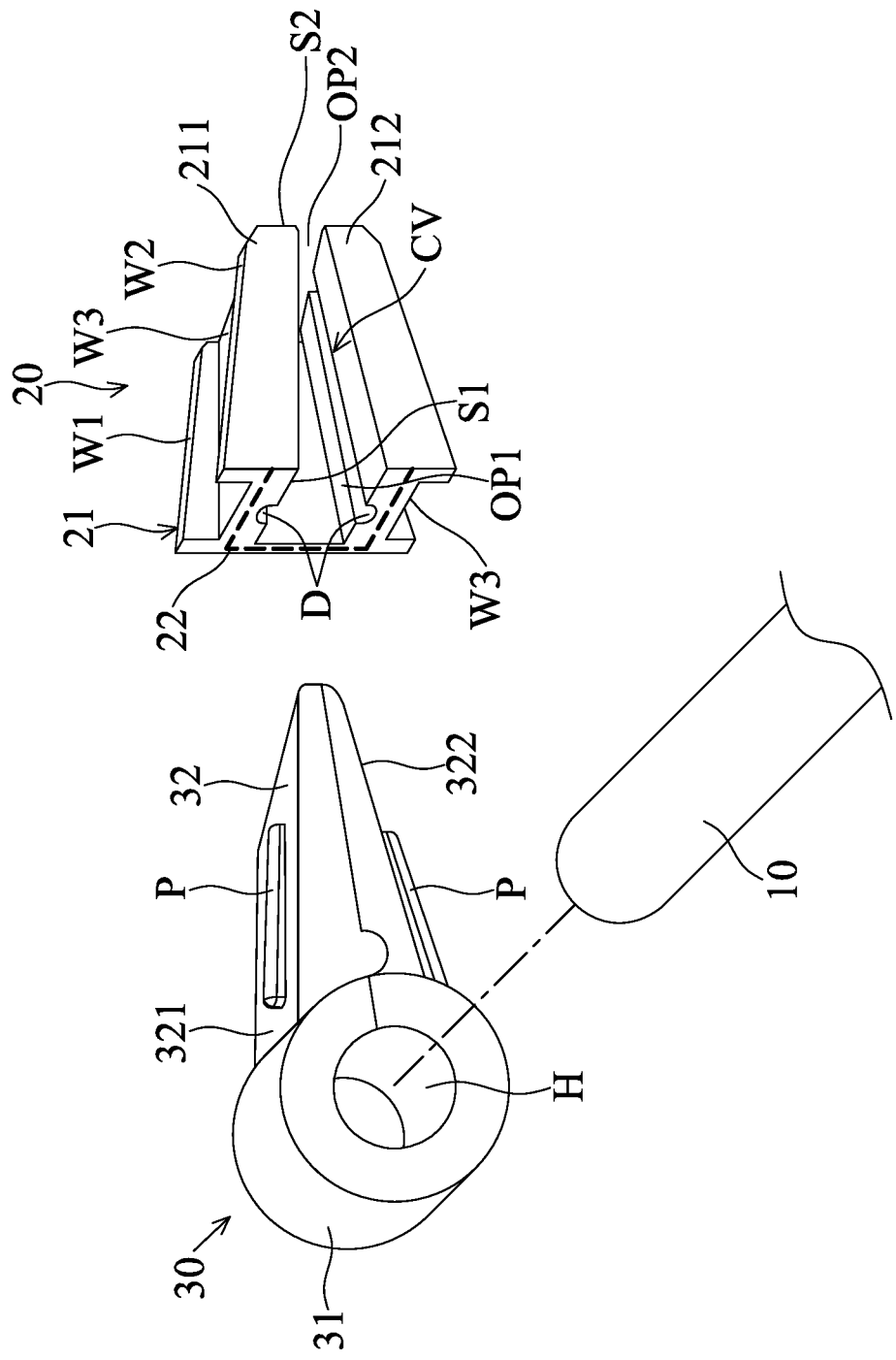
FIG. 2 is an exploded view of the vibration device in FIG. 1.

Please refer to FIGS. 1 and 2, wherein FIG. 2 is an exploded view of the vibration device 100 in FIG. 1. The vibration device 100 comprises a vibration source 10, a support member 20, and a vibration transmission member 30. The vibration transmission member 30 is configured to transmit vibration energy, and is connected to the vibration source 10 and the support member 20, so that the vibration energy generated by the vibration source 10 can be transmitted to the support member 20 via the vibration transmission member 30. In some embodiments, the vibration device 100 comprises the support member 20 and the vibration transmission member 30, and the vibration source 10 belongs to an external device connected to the vibration transmission member 30 and providing vibration energy.

The vibration source 10 can be a vibrator with a power source, or the power source can be housed in a separate controller. In some embodiments, a separate controller connects to the vibration source 10 by wire or wireless means to provide control signals and/or power to the vibration source.

The support member 20 is adapted to fit in the space between the upper and lower teeth on one side of the mouth and has a mesial end 201 and a distal end 202. The support member 20 has an elastic layer 21 covering the surfaces of the support member 20 which the teeth contact. The support member 20 includes an upper part 211 and a lower part 212 respectively corresponding to the upper and lower teeth. Each part (211, 212) has a U or C-shaped structure, so that the teeth can stably abut on it. Specifically, each part (211, 212) has two opposite lateral walls W1, W2 and an abutting wall W3. The abutting wall W3 is connected to the lateral walls W1, W2, and configured to allow the teeth to contact with it. The abutting wall W3 (top surface) of the upper part 211 is configured to contact the upper teeth, and the abutting wall W3 (bottom surface) of the lower part 212 is configured to contact the lower teeth. The lateral walls W1, W2 are configured to hold the teeth, so that a stable support can be provided to the teeth via the support member 20. In some embodiments, the elastic layer 21 is soft and flexible, and is made of a silicone material suitable for intraoral dental use.

The support member 20 includes a frame 22 which is covered or enclosed by the elastic layer 21, configured to maintain a shape which defines an inner cavity CV having a trapezoidal shape. The top and bottom surfaces W3 are set at an angle such that a vertical distance between the top surface W3 and the bottom surface W3 gradually decreases from the mesial end 201 to the distal end 202 of the support member 20. In some embodiments, the frame 22 comprises a metal material suitable for oral applications, such as stainless steel or titanium alloy. In other embodiments, the frame 22 comprises a stiff plastic material suitable for oral applications. The cavity CV has a wider first opening OP1 formed on a first side (or mesial end) S1 of the support member 20 and a narrower second opening OP2 formed on a second side (or distal end) S2 of the support member 20 opposite the first side S1. In this embodiment, the first and second openings OP1, OP2 are arranged along the long axis direction of the support member 20, and the size of the first opening OP1 is larger than the size of the second opening OP2. The support member 20 is designed to fit between the upper and lower teeth when the jaw is open in a rest position, with the narrower end pointing to the distal position. When the support member 20 is placed in the mouth, it acts as a prop to keep the jaw open, which allows the patient to rest the jaw muscles while maintaining the position.

Referring to FIGS. 1 and 2, the vibration transmission member 30 has a connector end 31 (or extraoral end) and a narrowing insertion end (or intraoral end) 32. The connector end 31 of the vibration transmission member 30 has a round shape with a hole H for connecting the vibration source 10. The connector end 31 extends to the outside of the mouth to connect with the vibration source 10. The vibration source 10 fits in the hole H at the connector end. The insertion end 32 is designed in a shape (such as trapezoidal shape) that matches the shape of the inner cavity CV of the support member 20, and configured to be inserted thereinto, so as to transmit the vibration energy generated by the vibration source 10 to the upper and lower teeth of the patient. The insertion end 32 has a protrusion P disposed on both the upper surface 321 and the lower surface 322 of the insertion end 32, and the protrusion P is configured to fit the depression D formed on the lower side of the upper part 211 and the upper side of the lower part 212 of the support member 20, so that the vibration transmission member 30 can be stably retained in the support member 20. In some embodiments, the protrusion P may be disposed on at least one surface (the upper surface 321 or the lower surface 322) to fit the corresponding depression D.

With the vibration device 100, mechanical force patterns are provided to the teeth and the alveolar bone similar to those vibration effects generated during mastication following a regular masticatory pattern, which can provide better vibration effects for a patient to stimulate bone remodeling and facilitate teeth movement during orthodontic correction. In some embodiments, the support member 20 and the vibration transmission member 30 may be integrally formed.

Figure 3:
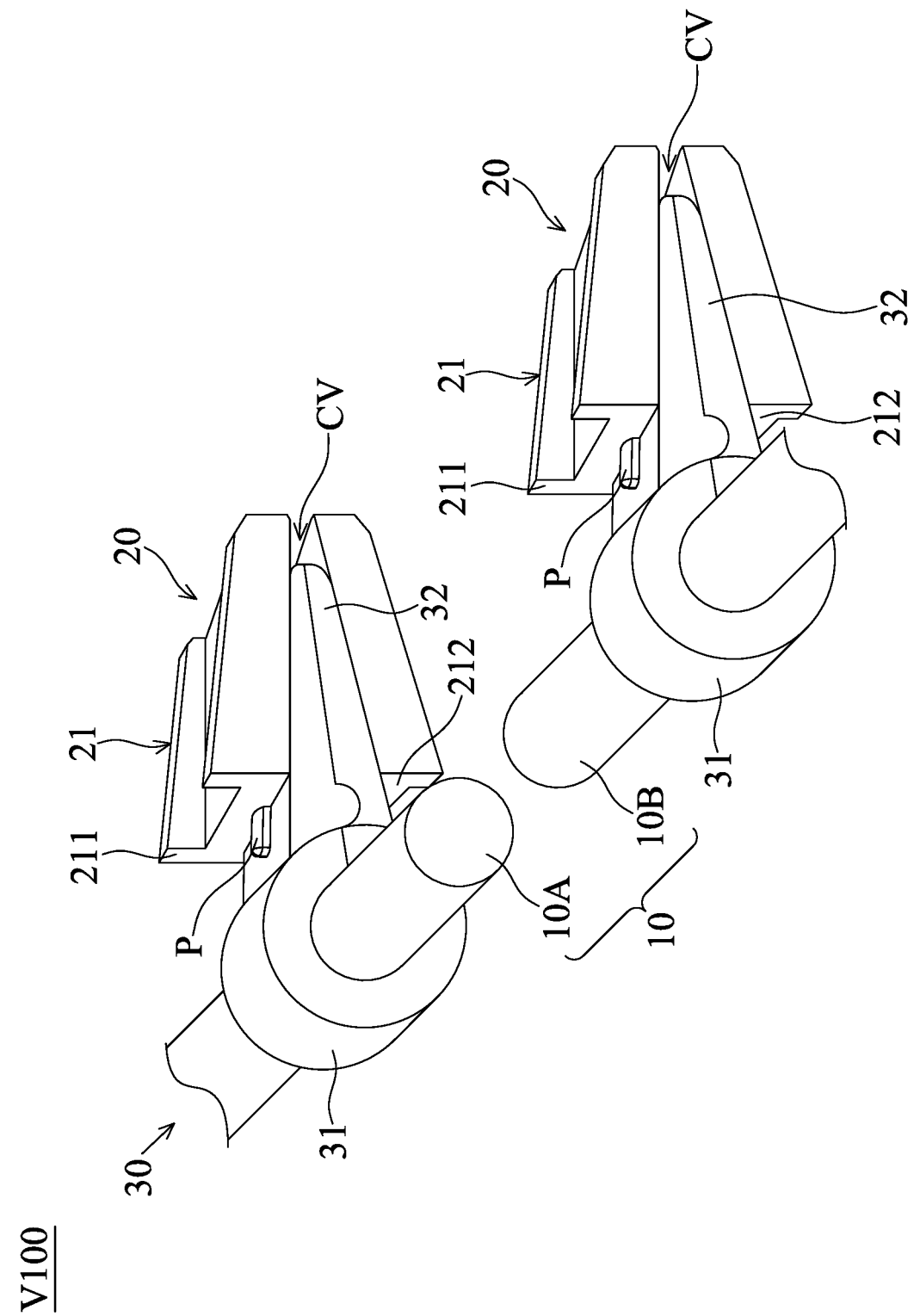
FIG. 3 is a schematic diagram of the vibration apparatus having a pair of vibration devices for dental use according to another embodiment of the present invention.

FIG. 3 shows a vibrating apparatus V100 according to another embodiment of the present invention. The vibrating apparatus V100 includes a pair of vibration devices 100 that serve as a vibrator assembly. The vibration devices 100 are designed to be mounted between the upper and lower teeth on the two sides of the mouth, respectively. The vibration source 10 may have two separate vibration sources 10A and 10B. Each separate vibration source 10A or 10B is independent and is connected to a vibration transmission member 30, to provide a vibration force to each support member 20. In some embodiments, the separate vibration sources 10A and 10B are connected by a connecting member so that the vibration source 10 can be used as a source component, and each separate vibration source (10A or 10B) has an independent control circuit.

In some embodiments, the two vibration devices 100 vibrate alternately. For example, setting seven (7) seconds as a period for the separate vibration sources 10A and 10B. First, one vibration source (10A or 10B) is activated to generate the vibration force to the support member 20 via vibration transmission member 30 on one side of the mouth for four seconds, followed by a rest period of three (3) seconds. Then, the other vibration source is activated to generate a vibration force to another support member 20 via the vibration transmission member 30 on the other side of the mouth for four seconds, followed by a rest period of three (3) seconds. With this working configuration, the separate vibration source for each side of the mouth is activated in turn with a rest period in between working sessions. The aforementioned predetermined setting time for the alternating vibrating devices 100 can be set with other periods, such as five (5) seconds or nine (9) seconds for a period, but it is not limited thereto.

Figure 4:
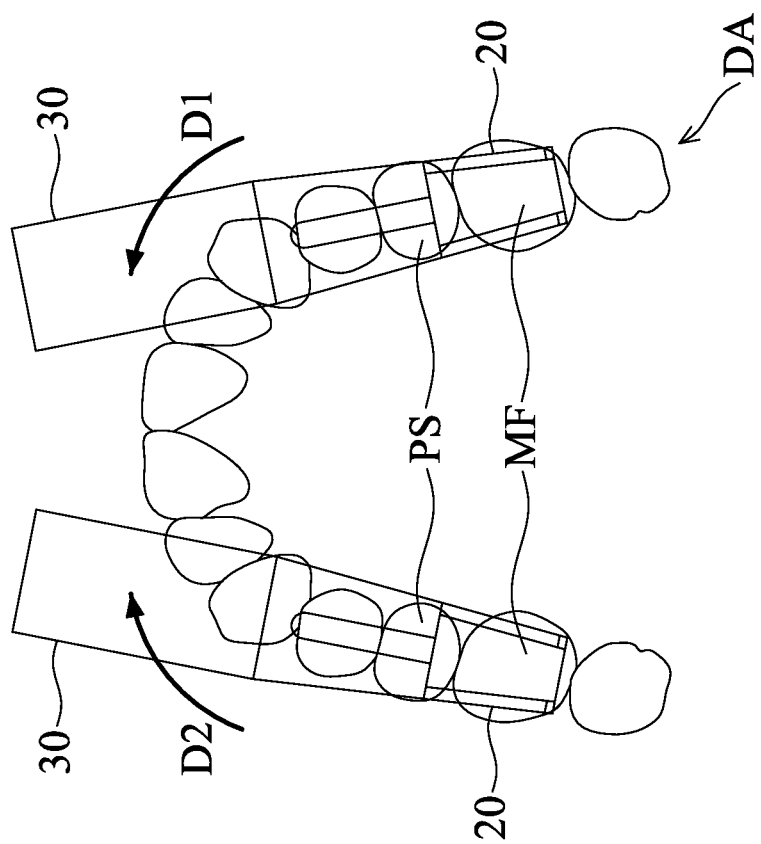
FIG. 4 is a schematic diagram of the location of the two vibration devices mounted in a dental arch DA.

FIG. 4 shows the location of the vibration devices 100 mounted in a dental arch DA. When using the vibration devices 100, the support member 20 is mounted between the upper and lower first molars MF and the second premolars PS on one side of the mouth (lower dental arch (including lower first molar and second premolar) not shown). When activating the vibration device 100 on one side (first side) of the mouth (or teeth), the vibration force is applied on the first side and transmitted to the other side (second side) of dental arch, along the direction D1. After a predetermined time, vibration on the first side of the mouth stops, and another vibration device 100 is activated to vibrate on the second side of the mouth. The vibration force applied on the second side is transmitted to first side of mouth along the dental arch along the direction D2.

With alternating vibrations, all teeth receive vibration forces from the two vibration sources 10 on both sides of the mouth, which can enhance the vibration force on the teeth, so as to stimulate bone remodeling and accelerate teeth movement during orthodontic correction, such as wearing braces or other subsequent orthodontic correction devices.

Figure 5:
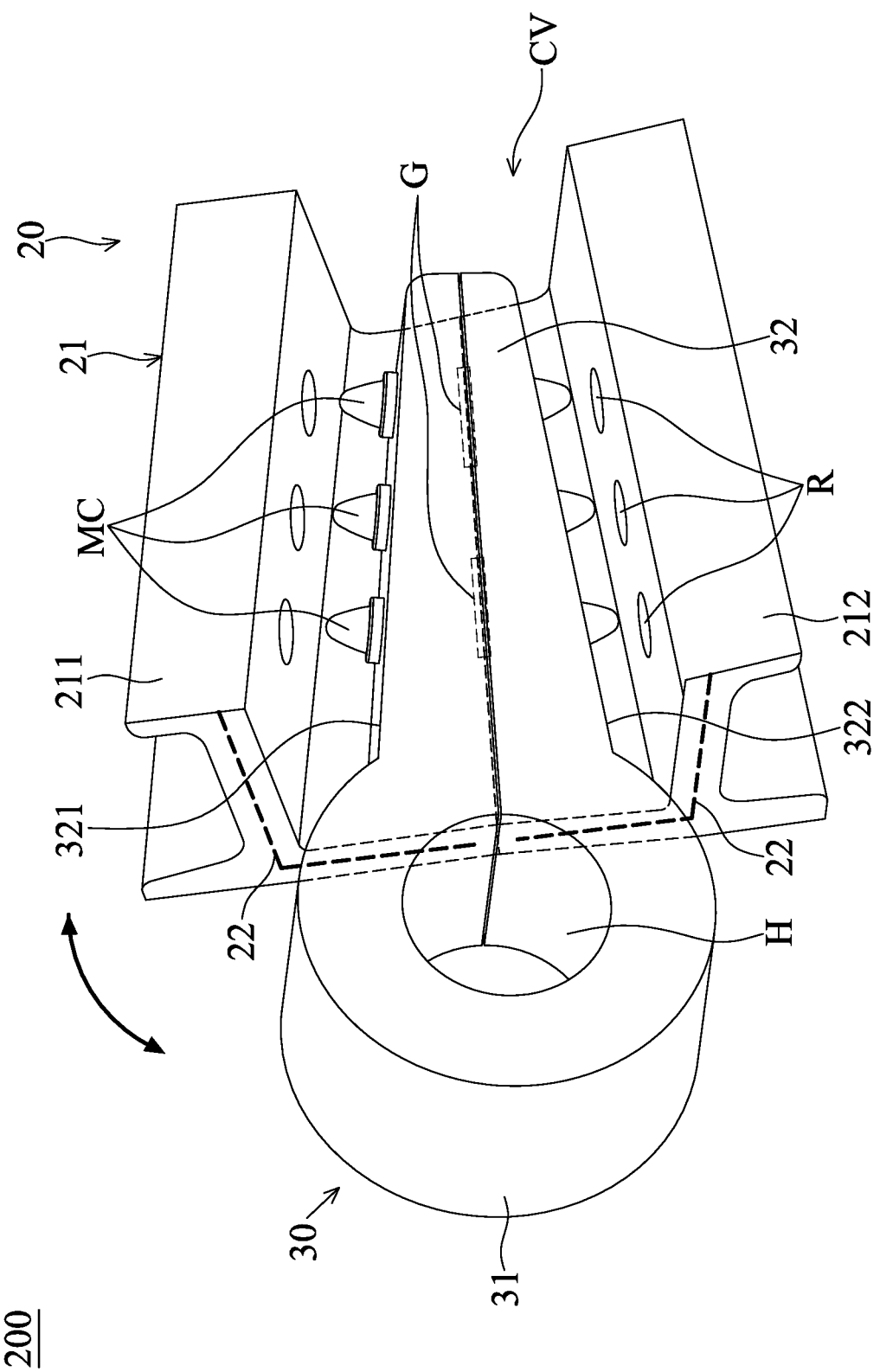
FIG. 5 is a schematic diagram of the vibration device for dental use in an open state according to another embodiment of the present invention.

FIG. 5 shows a vibration device 200 according to another embodiment of the present invention. The main difference between the vibration device 200 and the vibration device 100 (FIGS. 1-2) is that the vibration device 200 further comprises a hinge mechanism G formed with the metal frame 22 and a plurality of protruding contacts MC disposed on the insertion end 32 of the vibration transmission member 30, which correspond to a plurality of recesses R and are received therein.

Figure 6:
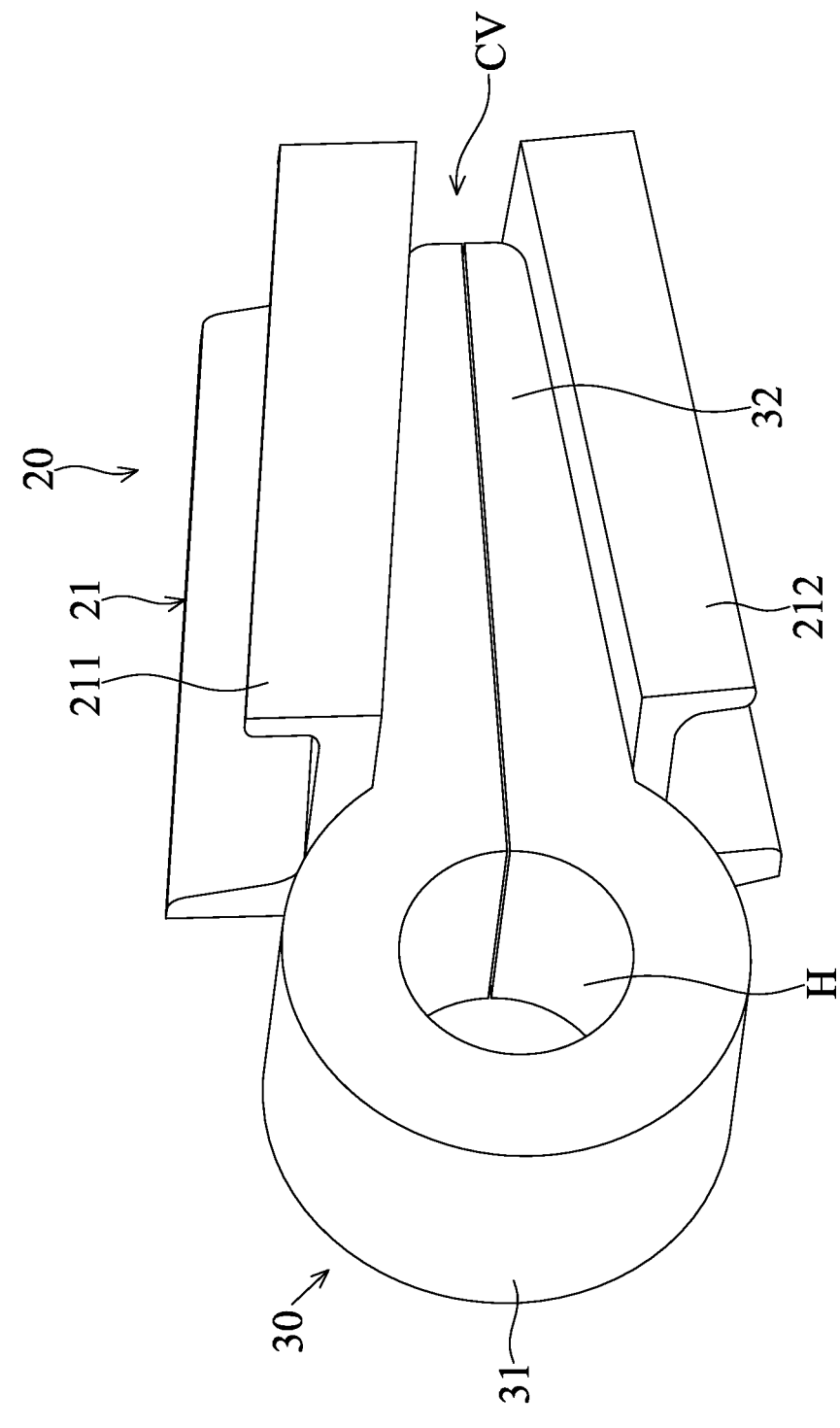
FIG. 6 is a schematic diagram of the vibration device for dental use in a closed state according to another embodiment of the present invention.

In this embodiment, the upper part 211 and the lower part 212 of the support member 20 are pivotally connected via the hinge mechanism G, so that the support member 20 can be switched between an open state and a closed state (as indicated by the double arrow in FIG. 5). When the support member 20 in an open state, it allows the vibration transmission member 30 to be easily inserted in the inner cavity CV thereof due to there being more space for assembly while in the open state. When the support member 20 is closed (FIG. 6, in the closed state), the support member 20 snaps shut to engage the vibration transmission member 30, so that the support member 20 and the vibration transmission member 30 are stably assembled.

It should be noted that there are protruding contacts MC disposed on both the upper surface 321 and the lower surface 322 of the insertion end 32, which are configured to contact with the corresponding recesses R which are formed on both the upper part 211 and the lower part 212 of the support member 20 and be exposed on the inner cavity CV of the support member 20. With this configuration, the vibration transmission member 30 can be better positioned to engage with the support member 20 via the protruding contacts MC 30 and the recesses R.

The protruding contacts MC strike the exposed recesses R when the vibration transmission member 30 vibrates. Each strike produces the vibratory force that is transferred to the teeth (and alveolar bone) in contact with the support member 20. In this way, the vibratory force transmitted to the teeth can better simulate the contact forces produced during mastication or chewing. In some embodiments, both the protruding contacts MC and the recesses R have metal material or made of metal. When the vibration transmitting member 30 vibrates, the metal protruding contacts MC contact or strike the metal recesses R, which can effectively transmit the vibration force. In another embodiment, the protruding contact MC is accommodated in the recess R and contacts the metal frame 22.

In this embodiment, there are two rows (along the long axis of the vibration transmission member 30) of protruding contacts MC disposed on the opposite sides of the insertion end to correspond respectively to the two rows of independent recesses R. In some embodiments, different configurations of protruding contacts MC and recesses R (such as at least one, two or more contacting pairs of MC and recess R) also have the effect of enhanced placement and energy transfer.

According to the foregoing embodiments, an orthodontic correction method is provided, comprising the mounting of a pair of vibration devices between the upper and lower teeth, one on each side of the mouth; and activating the vibration source for each side of the mouth in turn with a rest period therebetween. Each support member of the pair of vibration devices is mounted in the region between the upper and lower first molars and the second premolars on one side of the mouth. The connector end of the vibration transmission member for each of the vibration devices extends to the outside of the mouth to connect with the respective vibration source.

It should be noted that the features of the various embodiments can be combined and used as long as they do not violate or conflict the scope of the disclosure.

In summary, an embodiment of the present invention provides a vibration device for dental use, including a support member and a vibration transmission member. The support member is adapted to fit in the space between the upper and lower teeth on one side of the mouth, including a frame with an elastic layer. The frame is configured to maintain a shape defining an inner cavity, wherein the inner cavity has a first opening formed on the first side of the support member and a second opening formed on the second side of the support member opposite the first side. The first opening is larger than the second opening. The elastic layer covers the surfaces of the frame to protect the teeth and gums in contact. The vibration transmission member is configured to connect to the vibration source at the connector end and to be inserted into the inner cavity of the support member at the insertion end so as to transmit the vibration energy generated by the vibration source to the upper and lower teeth of the patient without the need to bite down continuously on the device.

An embodiment of the invention provides an orthodontic correction method, including mounting a pair of vibration devices between the upper and lower teeth on the two sides of the mouth; and activating the vibration source for each side of the mouth in turn with a rest period therebetween.

An embodiment of the invention provides a vibration device for dental use, comprising a support member and a vibration transmission member. The support member is adapted to fit in a space between upper and lower teeth on one side of the mouth, and includes a mesial end, a distal end, a top surface, and a bottom surface. The top surface is configured to contact the upper teeth, and the bottom surface is configured to contact the bottom teeth, with the top and bottom surfaces set at an angle such that a vertical distance between the top surface and the bottom surface gradually decreases from the mesial to the distal end of the support member. The vibration transmission member having an extraoral end and an intraoral end, configured to connect to a vibration source at the extraoral end and to the support member at the intraoral end so as to transmit a vibration energy generated by the vibration source to the support member and the upper and lower teeth of the patient in contact with the support member.

The embodiments of the present invention have at least one of the following advantages or effects. Through the vibration device, the vibration energy can be transmitted efficiently to the teeth of a patient to enhance teeth movement during orthodontic correction without requiring the patient to continuously bite down on the device. Using a method of alternate vibration, mechanical stimulation from the two vibration sources on both sides of the mouth is applied to the teeth in a way that can simulate the natural force patterns of mastication or chewing to facilitate orthodontic correction.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. A vibration device for dental use, comprising:
   a support member, adapted to fit in a space between upper and lower teeth on one side of the mouth, the support member comprising:
      a frame, configured to maintain a shape defining an inner cavity, wherein the inner cavity has a first opening formed on a first side of the support member and a second opening formed on a second side of the support member opposite the first side, a size of the first opening being larger than a size of the second opening; and
      an elastic layer, covering surfaces of the frame; and
   a vibration transmission member, configured to connect a vibration source, having a connector end for coupling the vibration source and an insertion end configured to be inserted into the inner cavity of the support member so as to transmit a vibration energy generated by the vibration source to the upper and lower teeth of the patient.

2. The vibration device as claimed in claim 1, wherein the inner cavity has a trapezoidal shape.

3. The vibration device as claimed in claim 1, wherein the insertion end of the vibration transmission member is designed in a shape that matches a shape of the inner cavity.

4. The vibration device as claimed in claim 3, wherein the insertion end has protrusions configured to fit depressions formed in the support member so that the vibration transmission member can be retained in the support member.

5. The vibration device as claimed in claim 1, wherein the connector end has a hole for connecting a vibrator of the vibration source.

6. The vibration device as claimed in claim 1, wherein the frame of the support member comprises metal material.

7. The vibration device as claimed in claim 1, wherein the elastic layer of the support member comprises a silicone material.

8. The vibration device as claimed in claim 1, wherein the support member further comprises a hinge mechanism configured to allow the support member to switch between an open state and a closed state.

9. The vibration device as claimed in claim 8, wherein when the vibration transmission member is inserted into the inner cavity of the support member and the support member is switched from the open state to the closed state, the vibration transmission member is engaged with the support member.

10. The vibration device as claimed in claim 1, wherein the insertion end has at least one protruding contact formed thereon configured to contact at least one recess exposed on an inner cavity of the support member.

11. The vibration device as claimed in claim 10, wherein the insertion end further has a plurality of protruding contacts disposed on both upper and lower surfaces of the insertion end;

the support member further has a plurality of recesses formed on both an upper part and a lower part of the elastic layer, and the recesses are exposed on the inner cavity of the support member; and wherein each protruding contact corresponds to each recess and is received therein.

12. A vibration apparatus for dental use, consisting of a pair of vibration devices, each vibration device comprising:
a support member, adapted to fit in a space between upper and lower teeth on one side of the mouth, the support member comprising:
a mesial end;
a distal end;
a top surface, configured to contact the upper teeth; and
a bottom surface, configured to contact the bottom teeth, with the top and bottom surfaces set at an angle such that a vertical distance between the top surface and the bottom surface gradually decreases from the mesial to the distal end of the support member, wherein when placed in the mouth, the support member acts as a prop to keep the jaw open at a rest position; and
a vibration transmission member having an extraoral end and an intraoral end, configured to connect to a vibration source at the extraoral end and to the support member at the intraoral end so as to transmit a vibration energy generated by the vibration source to the support member and the upper and lower teeth of the patient in contact with the support member;
wherein the pair of vibration devices are configured to vibrate alternately.

13. The vibration apparatus as claimed in claim 12, wherein an inner cavity of the support member is formed between the top surface and the bottom surface, and the inner cavity opens at the mesial end and the distal end of the support member, and wherein the intraoral end has a trapezoidal shape which matches a shape of the inner cavity of the support member.

14. An orthodontic correction method, comprising:
mounting a pair of vibration devices as claimed in claim 1 between the upper and lower teeth on the two sides of the mouth; and
activating the vibration source for each side of the mouth in turn with a rest period therebetween.

15. The orthodontic correction method as claimed in claim 14, wherein each vibration device is mounted between upper and lower first molars and second premolars on one side of the mouth.

16. The orthodontic correction method as claimed in claim 14, wherein the connector end of the vibration transmission member for each of the vibration devices extends to the outside of the mouth to connect with the respective vibration source.

* * * * *